United States Patent [19]

Iwao et al.

[11] Patent Number: 4,726,439
[45] Date of Patent: Feb. 23, 1988

[54] TRUNK STRUCTURE IN SCOOTER-TYPE VEHICLES

[75] Inventors: Eiichi Iwao; Hiroshi Shimoyama; Kiyoshi Ohno, all of Saitama, Japan

[73] Assignee: Honda Giken Kogyo Kabushiki Kaisha, Tokyo, Japan

[21] Appl. No.: 915,525

[22] Filed: Oct. 6, 1986

[30] Foreign Application Priority Data

Oct. 5, 1985 [JP] Japan .............................. 60-222181
Oct. 25, 1985 [JP] Japan .............................. 60-238672

[51] Int. Cl.$^4$ ............................................... B62J 9/00
[52] U.S. Cl. .............................. 180/219; 280/289 A; 224/32 A; 296/37.1
[58] Field of Search ............... 180/219; 280/289 A, 280/289 R, 202; 296/37.1, 37.16, 78.1; 224/30 R, 32 A, 42.11, 273, 275

[56] References Cited

U.S. PATENT DOCUMENTS 3,788,532  1/1974  Bish ................................. 224/32 A
4,438,877  3/1984  Jackson ............................ 224/275
4,441,574  4/1984  Kohyama et al. ................ 224/32 A Primary Examiner—John J. Love
Assistant Examiner—Donn McGiehan
Attorney, Agent, or Firm—Lyon & Lyon

[57] ABSTRACT

A multi-wheeled vehicle of the motorcycle or motor scooter type including having a vehicle body including a front cover, a rear cover and a low-slung step portion which extends beneath the line connecting the front and rear axle of the vehicle. The vehicle is provided with a tandem seat which is positioned downwardly and forwardly. The vehicle body includes a frame having two lower members and one upper member arranged at the apices of a triangle and, in a preferred embodiment, at the apices of an isosceles triangle. A fuel tank is provided in the protected space between the body members and various metal flange members such that the tank is substantially arranged at the same level as the power unit and the lower surface of the tank may alson be below the level of the front and rear axles.

21 Claims, 16 Drawing Figures

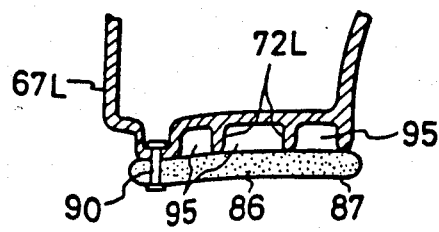
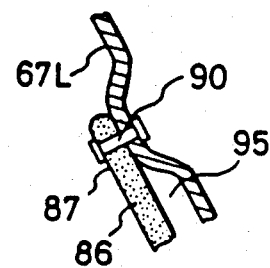
Fig. 12.
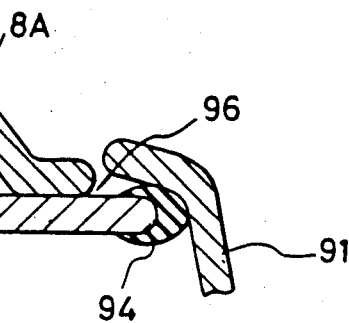
Fig. 13.

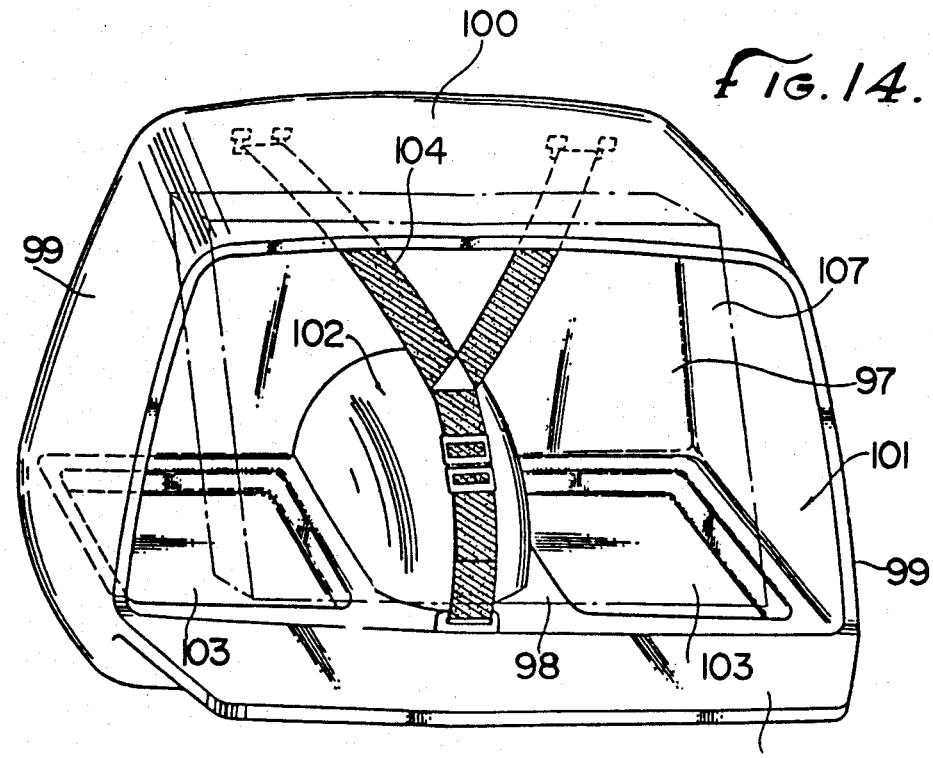
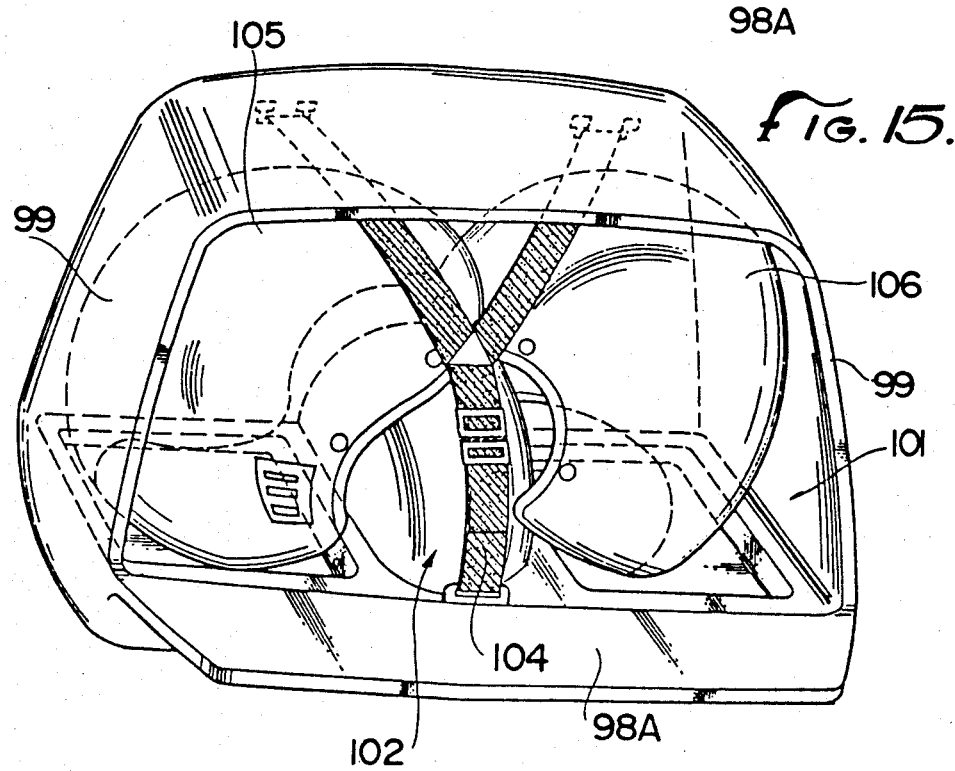

TRUNK STRUCTURE IN SCOOTER-TYPE VEHICLES

BACKGROUND

The field of the invention is the structure and arrangement of storage areas in scooter-type vehicles.

Scooter-type vehicles having a front leg shield, a body and a low-slung step portion between the leg shield and the body have been developed which include an engine and drive train, including a rear wheel, within the body portion of the vehicle. A seat for one or two riders is provided on the body portion above the engine and drive train. Certain such devices incorporate storage space within or as part of the body structure. However, when storage space is provided within the body itself, such storage space tends to be quite limited and not useful for certain articles which are most likely desired to be stored. Such articles would include an attache case or, in the case of a two-rider scooter, two protective helmets or the like. The limitations derive from the required space associated with the drive unit, including the space for the rear wheel and suspension to swing when operating under driving conditions. Conventionally only small spaces have been provided within the body portion between the rear wheel and the seat or seats for riders.

In providing such spaces, side trunks and the like have been employed which have required substantial additional components and assembly requirements. This may be particularly true because these storage compartments generally are independently provided.

SUMMARY OF THE INVENTION

In order to overcome the problems associated with the prior art, the present invention provides improved storage capacity for scooter-type vehicles of the type having a front leg shield, a body having a seat thereon and a low-slung step connecting the leg shield and the body. Expanded trunk space is provided within the body and above the rear wheel.

In accordance with the present invention, a box-type trunk structure located above the rear suspension and wheel within the body portion of a scooter may be provided with a centrally-mounted recess therein to accommodate the full travel of the rear suspension and rear wheel. The configuration is such that it may accommodate protective helmets, an attache case or the like.

The box-type trunk structure may also be designed in such a manner as to provide the upper fender mechanism for the rear wheel. Under such circumstances, fewer components are employed and reduced labor in assembly is achieved.

In another aspect of the present invention, the body of the vehicle may be formed wider than the low-slung step and the trunk compartment may extend to the shell of the body. Such an arrangement may be employed to increase body strength as well as contribute to additional storage space.

BRIEF DESCRIPTION OF THE DRAWINGS

The preferred embodiment of the present invention will hereinafter be described with reference to the accompanying drawings, wherein:

FIGS. 12a and 12b are sectional views taken along the lines II—II and III—III of FIG. 11, respectively;

FIG. 13 is an enlarged view of the essential part of FIG. 8;

FIG. 14 is a perspective view of the trunk body with an attache case illustrated in phantom; and FIG. 15 is a perspective view of the trunk body with two helmets illustrated in phantom.

DETAILED DESCRIPTION OF THE PREFERRED EMBODIMENT

Figure 1:
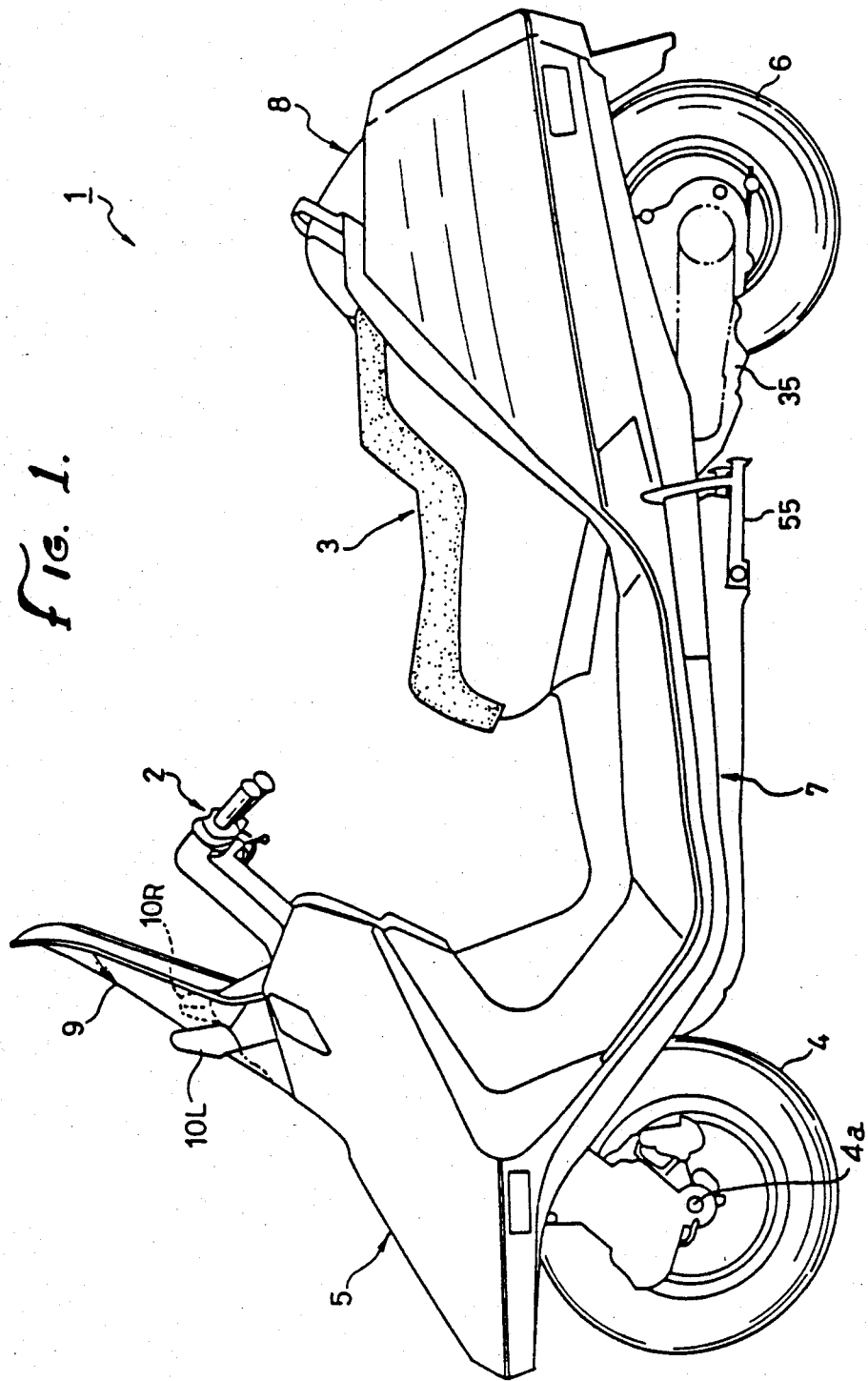
FIG. 1 is a side view of a multi-wheeled vehicle according to the present invention.

Referring to FIG. 1, a scooter type vehicle 1 according to the present invention has a body structure of a so-called American type such that a handle 2 is provided at a high position, and a seat 3 is provided at a lower position. A wheel base of the vehicle 1 is much longer than that of a conventional motorcycle. The seat 3 is a so-called V-shaped seat of an integral type having a rider seat and a tandem passenger seat. A leg shield having an acute shape as viewed in side elevation is provided over a front wheel 4 mounted on a front axle 4a. A low-slung step floor 7 is connected to the leg shield 5 and is arranged between the front wheel 4 and a rear wheel 6, mounted on a rear axle 6a (not shown).

A rear cover 8 is connected with the step floor 7 and covers an upper side of the rear wheel 6. The rear cover 8 has a slant front edge extending along a rear edge of the V-shaped seat 3. Thus, a body cover is constituted of the leg shield 5, the step floor 7 and the rear cover 8. A windshield 9 is provided over the leg shield 5 on a front side of the handle 2. Side mirrors 10L and 10R are mounted to left and right sides of the windshield 9.

Figure 2:
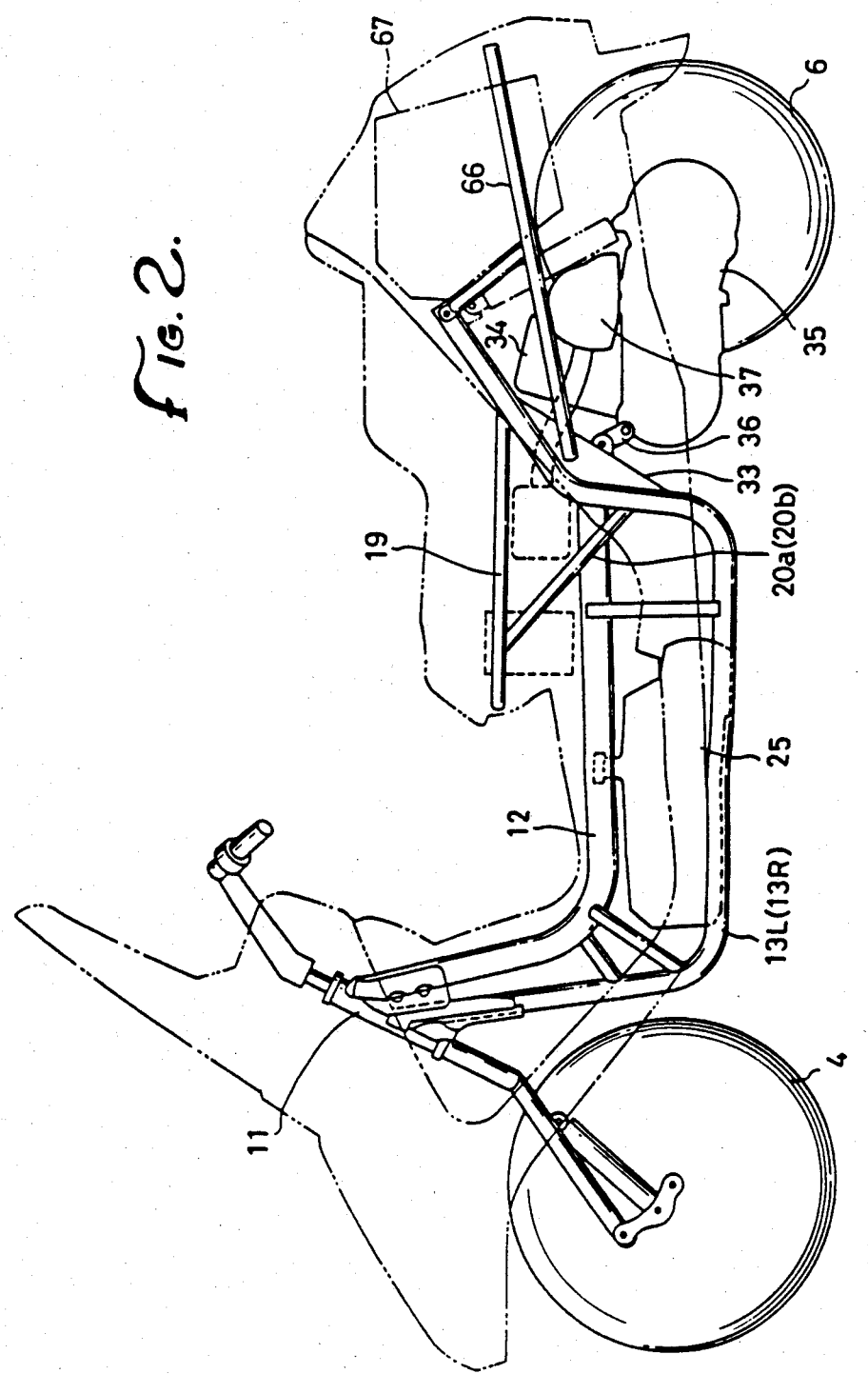
FIG. 2 is a partial cross-sectional left side view of a multi-wheeled vehicle according to the present invention.

Referring to FIG. 2, a vehicle body frame including a head pipe 11, a main pipe 12 and a pair of down pipes 13L and 13R is provided. The main pipe 12 extends obliquely downwardly from the head pipe 11. The main pipe 12 further extends horizontally from an upper rear side of the front wheel 4 to a rear portion of the vehicle body. As illustrated in the figures, the main pipe 12 extends substantially along the centerline of the vehicle body.

Figure 3:
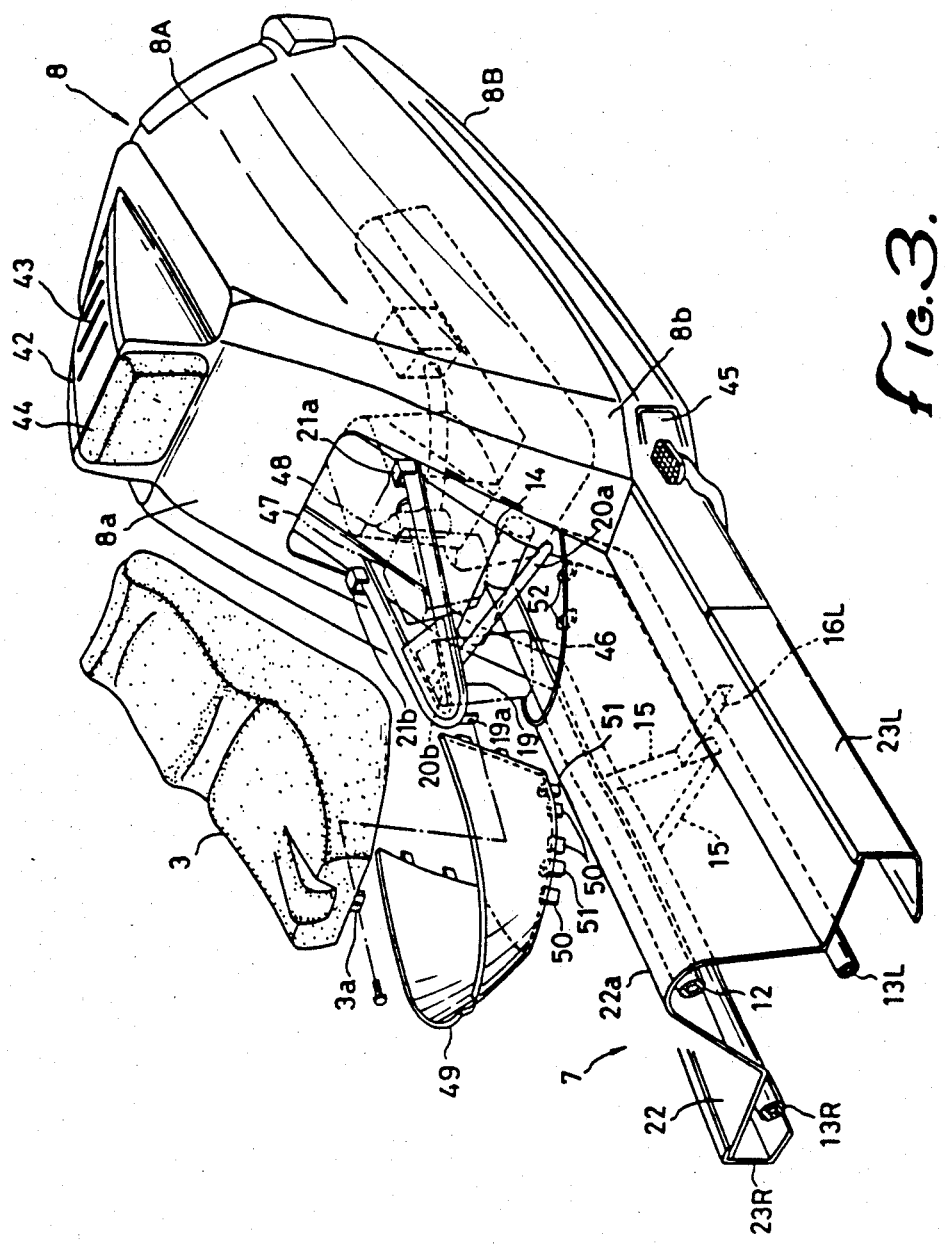
FIG. 3 is an exploded perspective view of the seat portion of a multi-wheeled vehicle.
Figure 4:
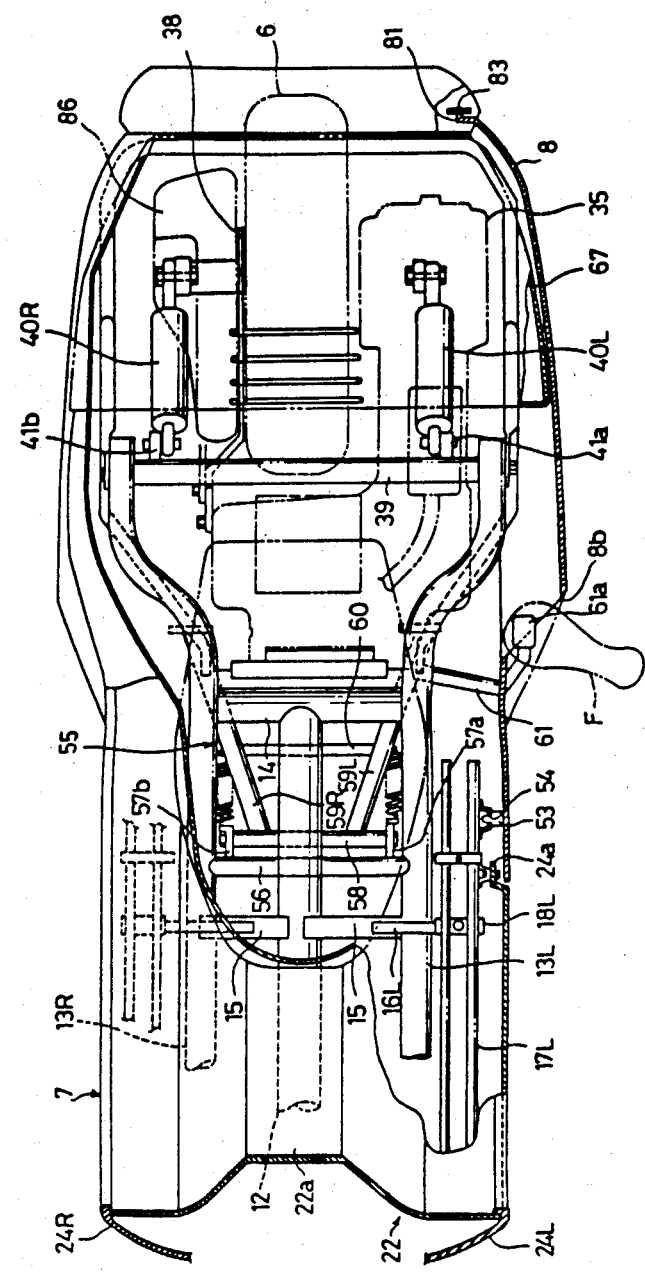
FIG. 4 is broken plan view of the rear portion of a body of a multi-wheeled vehicle according to the present invention.

The pair of down pipes 13L and 13R extend obliquely downwardly from the head pipe 11 to a position lower than the main pipe 12, and further extend in parallel to each other to the rear portion of the vehicle body. At the rear of the vehicle body, the down pipes 13L and 13R rise substantially upright, and further extend obliquely upwardly to a further rear portion of the body. As shown in FIGS. 3 and 4, a cross member 14 is fixed between the upright rising portions 13a of the down pipes 13L and 13R and is connected at its intermediate portion to the rear end of the main pipe 12.

Figure 5:
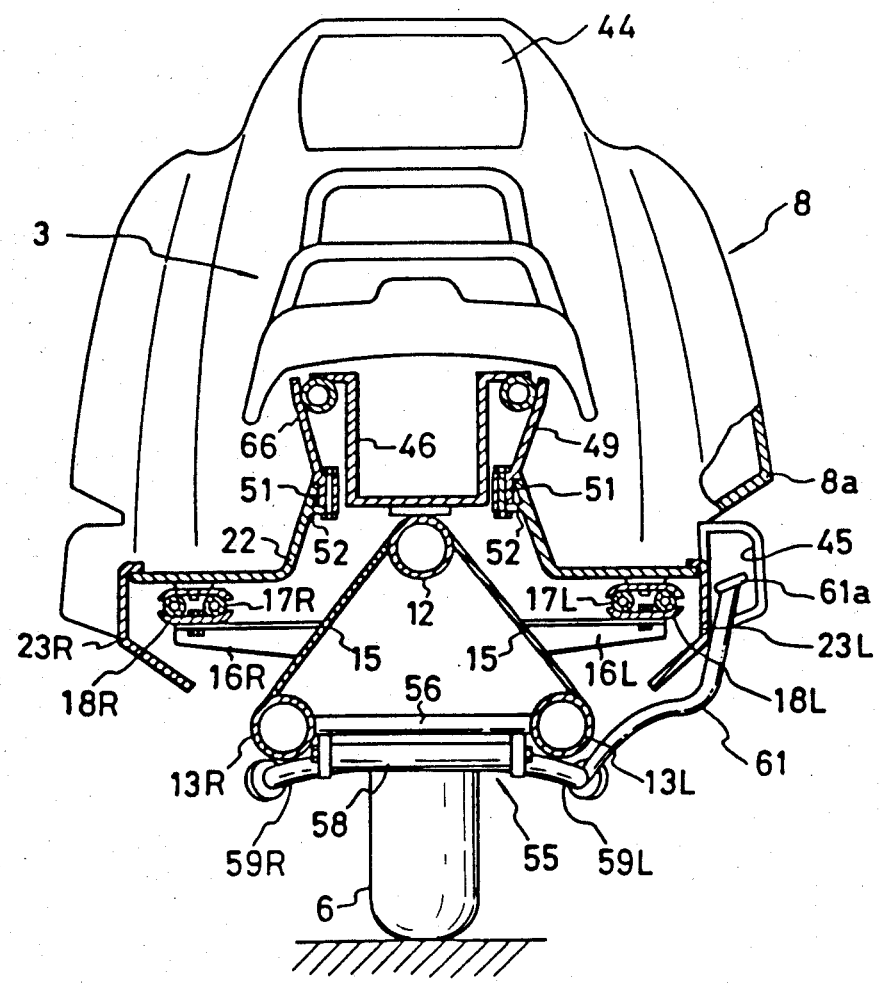
FIG. 5 is a front elevational view of the rear portion of a multi-wheeled vehicle body as cut at the central portion of the body.
Figure 6:
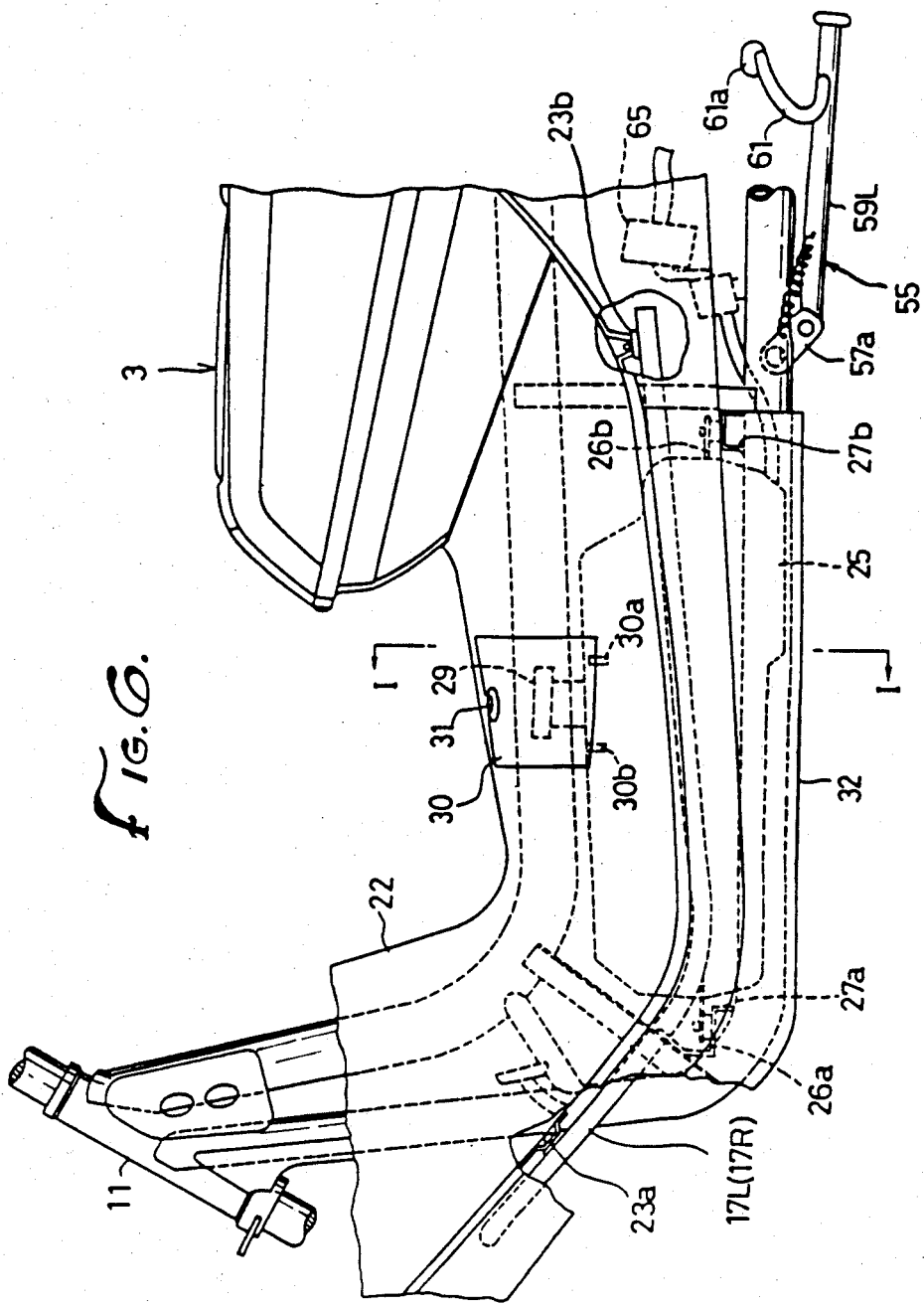
FIG. 6 is a side view of the step floor as partly broken.

As is best seen in FIG. 5, the horizontally extending portions of the main pipe 12 and the down pipes 13L and 13R are arranged in such a manner that three lines connecting the pipes 12, 13L and 13R form a triangle and, in the preferred embodiment, an isosceles triangle having a vertex at the main pipe 12. The frame members 12, 13L and 13R are connected to one another by means of gusset plates 15. A pair of stays 16L and 16R each having a sectional L-shape are projected sidewardly from the gusset plates 15. Longitudinal U-shaped pipes 17L and 17R are fixed by mounting means such as screws through mounting plates 18L and 18R to the stays 16L and 16R. As shown in FIG. 6, the longitudinal U-shaped pipes 17L and 17R extend substantially along the length of the main pipe 12 from a lower position of the head pipe 11 to a lower position of the seat 3 and are clamped into a fixed relationship so as to maintain the spacing thereof.

Referring to FIGS. 2 and 3, a substantially U-shaped seat pipe 19 is connected by welding or the like at its rear ends to the rear inclined portions of the down pipes 13L and 13R, and is supported at a front end portion by support pipes 20a and 20b fixed to the upright rising portions of the down pipes 13L and 13R. The V-shaped seat 3 is placed on the seat pipe 19 and is fixed thereto in such a manner that hooks 3a formed at a rear portion of the seat 3 (see FIG. 8) are engaged with engagement portions 21a and 21b formed on the seat pipe 19. Fixing portion 3b is then connected to the fixing portion 19a of the seat pipe 19.

As shown in FIGS. 3 and 4, the low-slung step floor 7 as previously mentioned is formed by a floor panel 22 extending along the main pipe 12 and the pair of down pipes 13L and 13R. The floor panel 22 has a convex portion 22a at a central portion where the main pipe 12 is positioned. As shown in FIG. 6, the floor panel 22 is bolted to mounting plates 23a and 23b fixed at the front and rear end portions of the longitudinal U-shaped pipes 17L and 17R. Side panels 24L and 24R are provided on both side edges of the floor panel 22 and are bolted at its rear end bent portion 24a to the rear end portion of the longitudinal U-shaped pipes 17L and 17R, respectively, as shown in FIG. 4.

Figure 7:
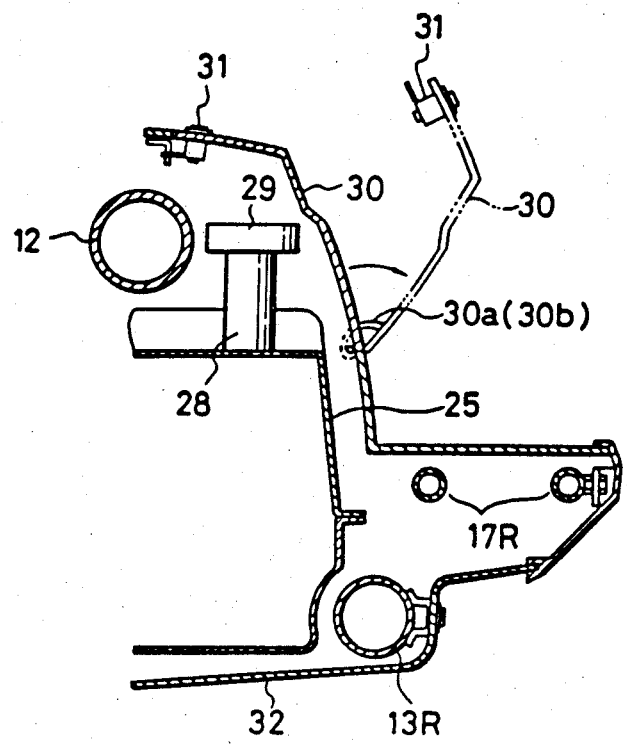
FIG. 7 is a cross-sectional view taken substantially along line I—I in FIG. 6.

Referring to FIGS. 6 and 7, a fuel tank 25 is provided between both the horizontal extending portions of the down pipes 13L and 13R, and is bolted at its mounting stays 26a and 26b projected from front and rear ends thereof to mounting plates 27a and 27b fixedly provided between the pair of down pipes 13L and 13R. The fuel tank 25 is provided with a fuel filler pipe 28 projecting from the upper surface at a right-hand position of the main pipe 12 with respect to a vehicle advancing direction, for example, and the fuel filler pipe 28 is closed by a fuel cap 29 at an opening end. The floor panel 22 is formed with an opening portion at an upper position of the fuel cap 29 for the purpose of supplying fuel to the fuel tank 25, and a lid 30 is openably mounted to the opening portion by means of hinges 30a and 30b. The lid 30 is provided with a key 31 at a central position of a free end thereof. An underguard plate 32 for protecting the fuel tank 25 is provided below the fuel tank 25, and is engaged at both side edges with lower side edges of the side panels 24L and 24R.

Figure 8:
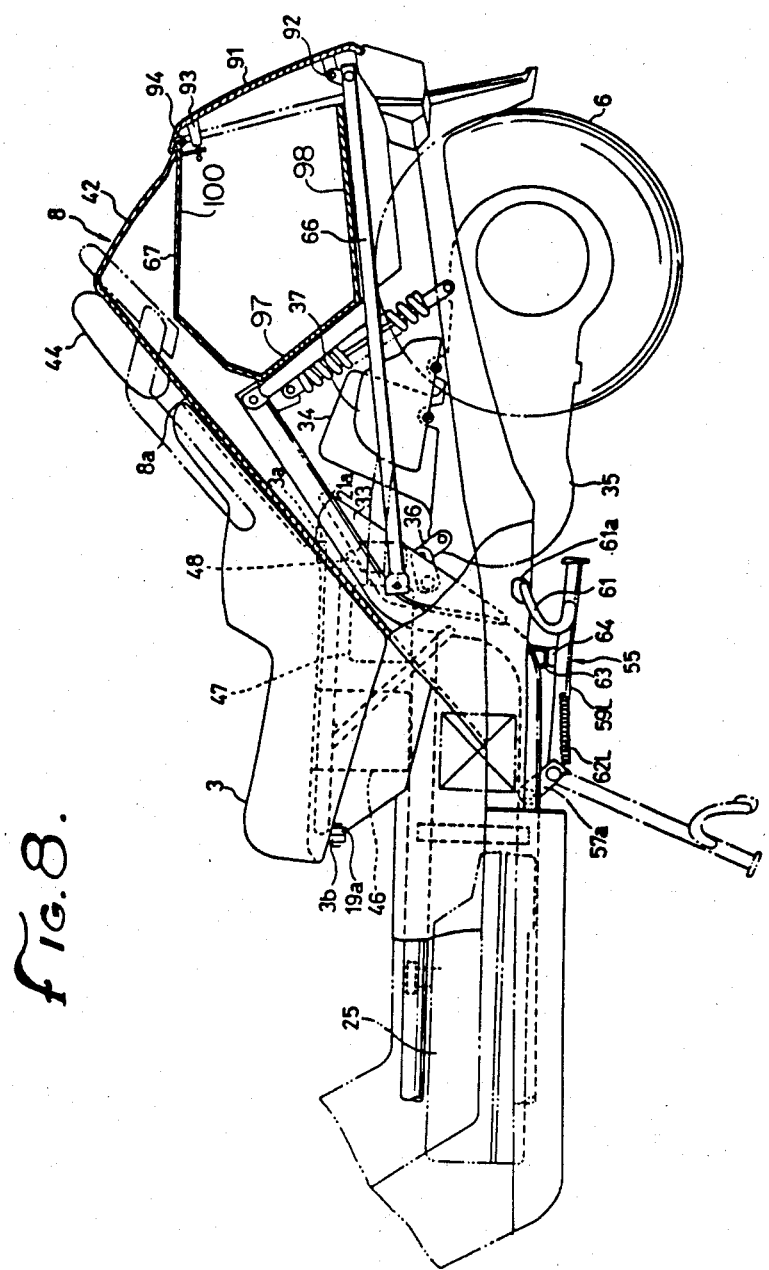
FIG. 8 is an enlarged side view of the rear portion of a multi-wheeled vehicle body in partial cross section.

Referring to FIGS. 2 and 8, triangular gusset plates 33 are welded to the rear rising portions of the pair of down pipes 13L and 13R. A power unit 35 is integrally formed with an engine to transmit the power of the engine 34 to the rear wheel 6. The power unit 35 is swingably mounted at its front end through a link 36 about an axle 36a connected to one of the gusset plates 33. An air cleaner 37 is mounted on the power unit 35. The rear end portion of the power unit 35 is connected to the left side of the rear wheel axle 6a to drive the vehicle in an advancing direction.

As shown in FIG. 4, the right side of the rear axle 6a is connected to a rear end portion of a support plate 38 mounted to the crank case of the engine 34 at a front end portion thereof. A muffler 86 is provided on the outside of the support plate 38. As is apparent from FIG. 4, the rear rising portions of the down pipes 13L and 13R are divergently arranged so that the air cleaner 37 may move sufficiently without hindering the swinging action thereof, and that a sufficient tilt angle of the down pipes 13L and 13R with respect to a vertical plane may be obtained. Further, the capacity of the rear trunk 67 which will be hereinafter described may be increased.

A cross member 39 is fixedly provided between the rear end portions of the down pipes 13L and 13R, and a pair of cushion members such as shock absorbers 40L and 40R for supporting the rear wheel 6 are mounted at respective upper ends of the cross member 39 through stays 41a and 41b. The cross member 39 acts to enhance the support strength of the cushion members 40L and 40R to the down pipes 13L and 13R.

Referring to FIGS. 3 and 8, the rear cover 8 has a projection 42 at an upper portion thereof. The projection 42 is formed with a plurality of louvers 43 for discharging heat from the engine 34 on a rear slant surface thereof. With this arrangement, the heat from the engine 34 rises along an upper slant surface of the rear cover 8 to the projection 42, and is sucked out through the louvers 43 by the action of air flow along the rear slant surface during running of the vehicle. Thus, heat may be smoothly discharged from the louvers 43.

A back rest 44 is provided on the front surface of the projection 42. Further, a partition board 8a formed of a heat insulating material is provided on the upper slant surface of the rear cover 8 inclined along the rear edge of the seat 3. The partition board 8a is preferably integrally formed with the rear cover 8 by using heat insulating resin. The provision of the heat insulating partition board 8a on the rear slant surface of the rear cover 8 hinders the engine heat from being transmitted to the seat 3, thereby protecting the seat 3 from the heat, and increasing the seat life.

The rear cover 8 consists of an upper cover 8A for covering a peripheral portion of the engine 34 and an upper portion of the rear wheel 6, and a lower cover 8B for covering the power unit 35, wherein the lower cover 8B may be separated from the upper cover 8A. With this arrangement, in case of maintenance of the power unit 35, for example, it is not necessary to fully remove the rear cover 8 from the body. Rather, it is sufficient to remove the lower cover 8B only, thus improving workability and the ease of vehicle maintenance.

The lower cover 8B is formed with an air inlet 45 opening on the front side for inducing air into the body during running. As shown in FIG. 4, the lower cover 8B is provided with a boss 53 on the inside of a front end portion. The boss 53 engages a mounting hole 54 formed at the rear end portion of the longitudinal U-shaped pipe 17L.

Arranged under the seat 3 are a battery case 46, a chamber 47 supplied with air from the air cleaner 37 through a not-shown tube, and a carburetor 48 communicating with the chamber 47. A lower seat cover 49 surrounds these components. As is apparent from FIG. 3, the convex portion 22a of the floor panel 22 is obliquely cut at a rear end portion, and the lower seat cover 49 is engaged with an obliquely cut portion of the convex portion 22a at a lower end thereof, thereby providing a continuous floor panel 22 and enhancing appearance of the body cover.

Further, since the lower seat cover 49 is connected to the floor panel 22 at a position higher than the floor surface of the floor panel 22, there is no possibility that sand and mud, etc. on the floor surface can enter the juncture between the lower seat cover 49 and the floor panel 22 into the body. The lower seat cover 49 is formed with a plurality of positioning portions 50 and a plurality of fixing portions 51 at a lower edge thereof. As shown in FIG. 5, the fixing portions 51 are bolted to the plurality of fixing portions 52 inwardly projecting from the obliquely cut portion of the projections 22a.

Referring to FIGS. 4, 6 and 8, a main stand 55 is located under the seat 3 between the underguard plate 32 and the power unit 35. As is apparent from FIG. 4, the main stand 55 includes a rotating shaft 58 rotatably mounted through stays 57a and 57b to a cross member 56 fixed between the pair of down pipes 13L and 13R, a pair of legs 59L and 59R fixed to the rotating shaft 58, and a cross member 60 fixed between the pair of legs 59L and 59R. As shown in FIG. 8, the main stand 55 is adapted to swing between an extended in-use position denoted by a dashed line and a retracted (not in-use) position denoted by a solid line. A return spring 62L is provided under tension between the leg 59L and the stay 57a. A stopper 63 abutting against the main stand 55 in the retracted position is provided in the vicinity of the rear rising portions of the down pipes 13L and 13R. A rubber member 64 serving as a cushion material is attached to the abutment surface of the stopper 63. The main stand 55 located between the underguard plate 32 and the power unit 35 also serves as a protection member for protecting an auxiliary machinery such as a fuel pump 65 located above the main stand 55, the engine 34 and the frame pipes.

The main stand 55 includes an arm 61 projecting outwardly from the leg 59L. The arm 61 is provided with a pedal 61a at a free end thereof. As shown in FIGS. 3 to 5, when the main stand 55 is in the retracted position, the pedal 61a is positioned on a front side of the air inlet 45 and on the inside of an outer edge of a projecting portion 8b of the rear cover 8. With this arrangement, as the pedal 61a of the arm 61 is retracted at a position below the projecting portion 8b of the rear cover 8 under the retracted condition of the main stand 55, there is no possibility of the pedal 61a obstructing a rider. In extending the main stand 55, a foot F is stepped to the position below the projecting portion 8b of the rear cover 8, and is mounted on the pedal 61a. Therefore, there is no interference by the rear cover 8 in use of the main stand 55.

Figure 9:
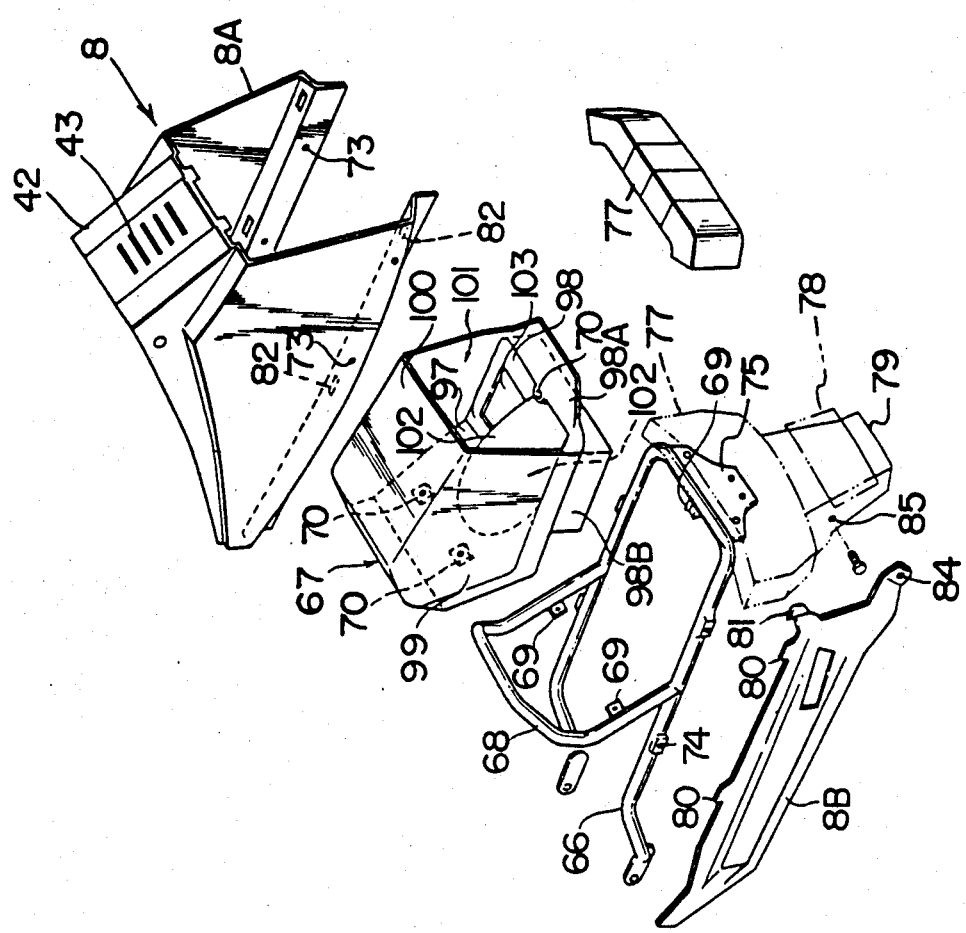
FIG. 9 is an exploded perspective view of a rear portion of a multi-wheeled vehicle body.

Referring to FIGS. 2 and 8, a trunk frame 66 extends from the gusset plates 33 welded to the rear rising portions of the down pipes 13L and 13R. A rear trunk 67 is mounted on the trunk frame 66. As is apparent from FIG. 9, the trunk frame 66 having a substantially U-shaped structure is fixed to the gusset plates 33 at front ends thereof, and is also fixed through support pipes 68L and 68R connected by welding or the like at intermediate portions to the down pipes 13L and 13R. For example, three fixing members 69 are connected to the frame 66 and the support pipes 68L and 68R, and are bolted to three mounting holes 70 provided at a bottom portion of the rear trunk 67.

Figure 10:
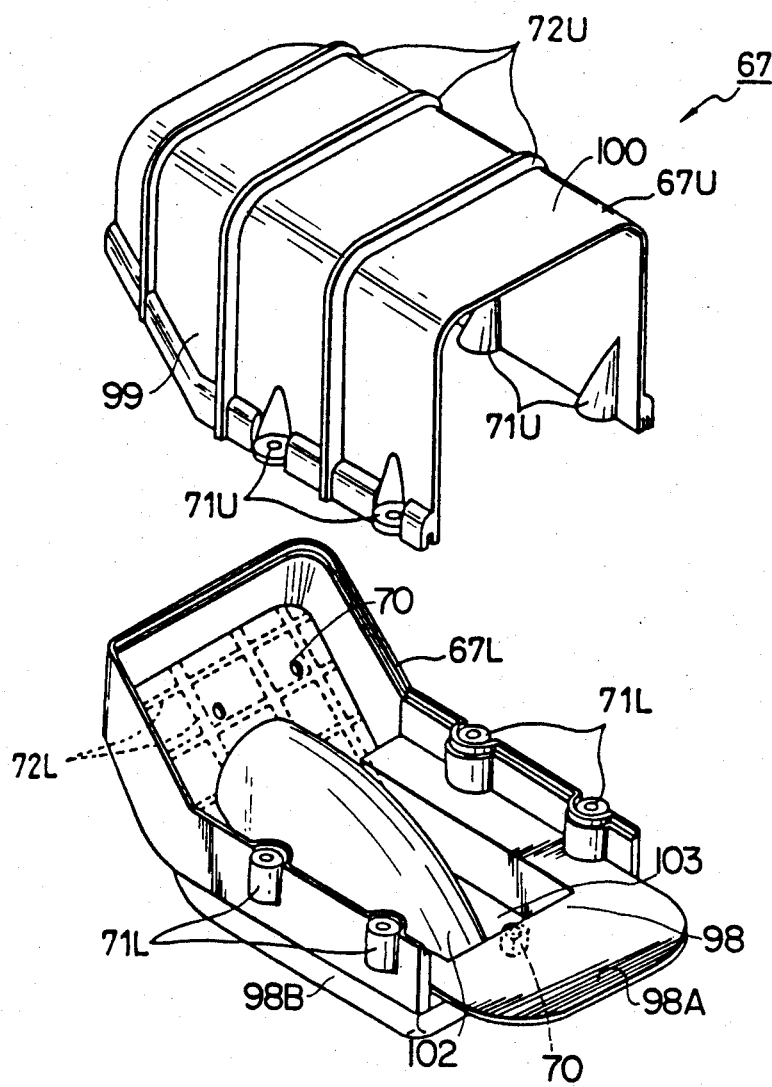
FIG. 10 is an exploded perspective view of the rear trunk of the present invention.

Referring to FIG. 10, the rear trunk 67 consists of an upper case 67U and a lower case 67L. The upper and lower cases 67U and 67L are engaged at respective opening ends, and are formed into an integral structure to define a trunk room. A plurality of fixing portions 71U and 71L formed at peripheral edges of the upper and lower cases 67U and 67L are fixed by means such as screws. The upper case 67U is integrally formed with a plurality of lateral ribs 72U on an outer surface thereof, and the lower case 67L is integrally formed with a plurality of longitudinal and lateral ribs 72 on a bottom surface thereof, thereby improving rigidity of the rear trunk 67.

Referring again to FIG. 9, the rear trunk 67 mounted on the trunk frame 66 is surrounded by the upper cover portion 8A of the rear cover 8. The upper cover 8A is connected to the trunk frame 66 by connecting means such as nuts 74 and not-shown bolts. A tail light assembly is mounted to a stay 75 welded to a rear end portion of the trunk frame 66. The tail light assembly includes a tail light 77 and a number guard 79 for mounting a number plate 78 thereon.

The lower cover 8B of the rear cover 8 has two upper projections 80 and an upper rear projection 81, which are engaged with holes 82 formed through the upper cover 8A and a hole 83 formed through the number guard 79, respectively. The lower cover 8B is bolted at a rear end hole 84 to the mounting hole 85 formed through the number guard 79. The front end portion of the lower cover 8B is engaged with the body frame by means of the boss 53 as previously mentioned with reference to FIG. 4.

Referring to FIG. 8, the rear trunk 67 is received in the rear cover 8, and opens to the rear side of the body. An opening edge of the rear trunk 67 is slightly projected from the rear end of the body (rear cover 8). A lid 91 for openably closing the opening of the rear trunk 67 is swingably mounted to the trunk frame 66 by means of hinges 92 at a lower end thereof. The lid 91 is provided with a key 93 at a central position of an upper end portion. A seal member 94 is mounted at the opening edge of the rear trunk 67, and is adapted to abut against the lid 91 under the closed condition, thereby improving water proofing performance of the rear trunk 67. Furthermore, as is apparent from FIG. 13, a groove 96 is defined by the rear edge of the upper cover 8A, the rear trunk 67 and the seal member 94. The groove 96 acts as a guide groove for drainage of rainwater.

As shown in FIG. 4, the rear cover 8 is wider than the step floor 7. The outer walls of the rear trunk 67 received in the rear cover 8 are arranged adjacent to an the inner surfaces of the rear cover 8. With this arrangement, a capacity of the trunk room of the rear trunk 67 may be increased, and the rear trunk 67 may be utilized as a reinforcing member for the rear cover 8, thereby improving rigidity of the rear cover 8 without using any dedicated reinforcing members.

Figure 11:
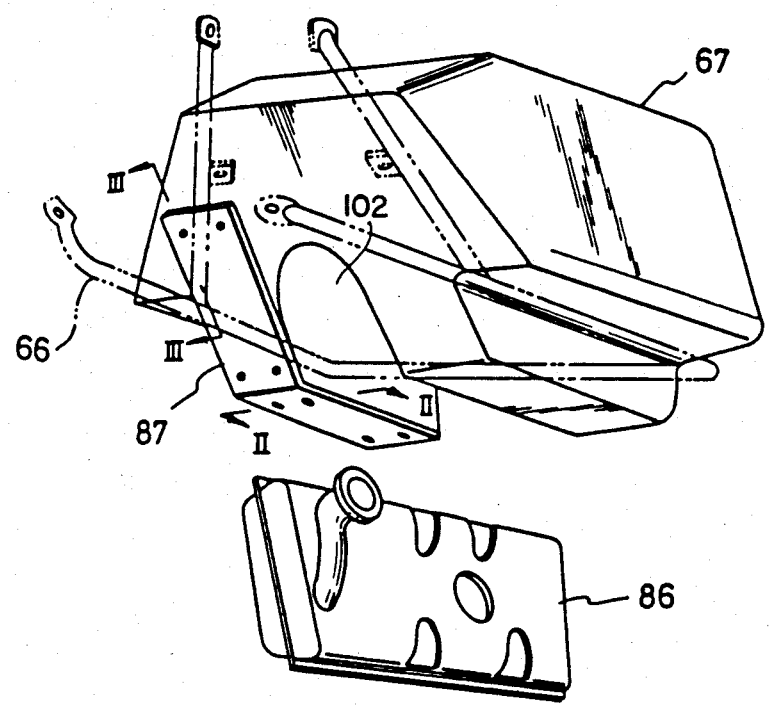
FIG. 11 is a perspective view showing the positional relationship between the rear trunk and the muffler shown from the oblique down side.

Referring to FIG. 11, a muffler 86 is located below the rear trunk 67. Heat insulating material 87 is mounted to the bottom plate of the trunk over the muffler 86, so as to insulate heat from the muffler 86. As shown in FIGS. 12A and 12B, the heat insulating material 87 is, for example, formed of glass wool and silver paper covering the glass wool and is fixed to the bottom plate of the trunk by fastening means such as rivets 90. The heat insulating material 87 serves to insulate the heat from the muffler 86 and protect the bottom plate of the trunk. Further, an air layer 95 is formed between the heat insulating material 87 and the bottom plate of the trunk by the provision of the ribs 72L, thereby further improving a heat insulating effect.

For purposes of example, the step floor 7, the rear cover 8, the floor panel 22 and the rear trunk 67 as described above may be made of resin, while the frame members consisting of the main pipe and the two down pipes may be made of steel.

Looking in greater detail to the trunk body 67, a slant front wall portion 97 extends forwardly and upwardly from a front edge of a bottom wall portion 98. Two sidewall portions 99 are connected to the bottom wall portion 98, the slant front wall portion 97 and a top wall 100. The rear opening 101 is formed on the case 67 at the opposite end from the slant front wall portion 97. The bottom wall portion 98 extends rearwardly on the vehicle from the rear opening 101 in an extended portion 98A such that it extends obliquely upwardly from the bottom wall portion 98. The bottom wall portion 98 is formed at its outer periphery with a projecting portion 98B which extends downwardly into the trunk frame 66.

The bottom wall portion 98 is further formed at its center with a curved portion 102 extending from the slant front wall portion 97 to the rear opening 101. The curved portion 102 forms an upper portion of a rear fender over the rear wheel 6. Thus, the trunk body 67 is formed with a curved recess beneath the trunk corresponding to the curved convex portion 102. The bottom wall portion 98 is also formed with a pair of shallow recesses 103 on opposite sides with respect to the curved portion 102.

The slant front wall portion 97 is formed with the two side mounting holes 70 while the bottom wall portion 98 includes the third mounting hole 70 near the edge of the extending portion 98A. The mounting holes and associated members are fixed by screws to the supporting brackets 69 formed at the side frame portions of the frame 68 and at the rear end of the trunk support frame 66. Thus, the trunk body 67 is securely fixed to the trunk frame 66. The curved portion 102 has a width which is slightly larger than that of the rear wheel 6. The location of the trunk body 67 on the support frame 66 is such that the bottom wall 98 including the curved portion 102 finds a space permitting the vertical swing of the rear wheel 6 without interference.

Located within the trunk body 67 is a Y-shaped stretchable baggage belt 104 made of rubber or the like which is provided above the curved portion 102. The baggage belt 104 is fixed at each end of the top wall 100 over each of the shallow recesses 103. The other end of the baggage belt 104 extends to the bottom wall portion 98 between the recesses 103.

The trunk body 67 is used for receiving various goods and is sized for accommodating helmets or an attache case. As illustrated in FIG. 15, two helmets 105 and 106 are illustrated within the trunk. The brow portion of each of the helmets is positioned over the curved portion 102 with the neck portions thereof extending into the recesses 103. This arrangement also provides stable support to retain the helmets in place in conjunction with the baggage belt 104. The space available for two helmets is advantageous because the vehicle is meant to accommodate two riders. The ability to store and lock two helmets thus frees the driver and passenger from having to carry a bulky helmet with them when off the vehicle so as to avoid theft.

In FIG. 14, an attache case 107 is illustrated in phantom within the trunk body 67. The placement of the attache case 107 requires the baggage belt 104 to be drawn out of the way and the attache case positioned as shown against the curved portion 102. The belt 104 may then be replaced such that it biases the attache case 107 into an engaging position with the curved portion 102 and the bottom wall portion 98. In this way, the attache case 107 may be stably supported and is prevented from rattling during running of the vehicle. The baggage belt 104 also prevents items carried within the trunk body 67 from engaging the door 91 and causing injury thereto.

Furthermore, since the lower wall 98 of the trunk 67, including the curved portion 102 is positioned above the rear wheel 6, this lower surface may form the upper portion of the rear fender. Thus, elements of the rear assembly may be eliminated with corresponding reductions in cost and weight. The overall configuration of the bottom of the trunk allows for greater storage capacity through utilization of the area to either side of the wheel not requiring as much vertical clearance. Naturally, other components of the drive train such as the cylinder of the engine, the air cleaner or the like may be accommodated through further bottom contour modifications.

Accordingly, an improved trunk mechanism is provided in accordance with the present invention. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. In a scooter-type vehicle having a low-slung step, a body portion rearwardly on the vehicle and upstanding from the step, a seat on the body portion; and a power unit including an engine, a drive train and a rear wheel vertically pivotable in the body portion, a trunk structure comprising
   a trunk body defining a storage enclosure positioned directly above said rear wheel within and enclosed by the body portion and having a bottom wall extending substantially the width of the body portion and contoured in position to provide clearance to allow full travel of the rear wheel during running.

2. The trunk structure of claim 1 wherein said body is wider than the low-slung step.

3. The strunk structure of claim 1 wherein said bottom wall includes a concavity on the lower side thereof centrally located in the vehicle to provide clearance for the rear wheel.

4. The trunk structure of claim 1 wherein said bottom wall extends downwardly below the uppermost travel of the rear wheel to either side of the rear wheel.

5. The trunk structure of claim 1 wherein said trunk body includes sidewall portions positioned immediately adjacent the inner sides of the body portion.

6. The trunk structure of claim 1 wherein said bottom wall defines the upper surface of a fender for the rear wheel.

7. The trunk structure of claim 1 wherein said trunk body extends to the rearmost portion of the body portion to form a rear opening, the body portion having an opening substantially coterminous with said trunk body.

8. A scooter-type vehicle having a low-slung step, a cover defining a body portion rearwardly on the vehicle and upstanding from the step, a seat on the body portion, and a power unit including an engine, a drive train and a rear wheel vertically pivotable in the body portion, comprising:
   a vehicle frame including a main frame extending upwardly and rearwardly in the body portion, a trunk frame extending rearwardly to the rear end of the body portion and a support structure including support members extending upwardly and forwardly from said trunk frame to said main frame in said body portion; and
   a trunk body defining a storage enclosure, said trunk body being positioned within the body portion and affixed to said trunk frame and said support structure above the rear wheel.

9. The scooter-type vehicle of claim 8 wherein said trunk body projects rearwardly to said cover and has a rear opening, and said cover having a rear opening substantially coterminous with said rear opening.

10. The scooter-type vehicle of claim 8 wherein the trunk body includes a bottom portion mounted to said trunk frame and an upper portion having sidewalls extending immediately adjacent the inside walls of said cover.

11. The scooter-type vehicle of claim 8 wherein said trunk body includes a bottom wall having a concave portion on the lower surface thereof to provide clearance to allow full travel of the rear wheel during running.

12. The scooter-type vehicle of claim 11 wherein said bottom wall extends below the upper path of travel of the rear wheel to either side of the rear wheel.

13. The scooter-type vehicle of claim 8 wherein said trunk frame supports the body portion of the vehicle.

14. The scotter-type vehicle of claim 9 further comprising a rear suspension including cushion members extending between said main frame and the drive train, said cushion members being inclined upwardly and forwardly from the drive train adjacent said support structure.

15. The trunk structure of claim 1 further comprising a baggage belt of resilient construction extending diagonally through a substantially portion of the interior of said trunk body.

16. A scooter-type vehicle having a low-slung step, a cover defining a body portion rearwardly on the vehicle and upstanding from the step, a seat on the body portion, and a power unit including an engine, a drive train and a rear wheel vertically pivotable in the body portion, comprising
   a vehicle frame within said body portion including a main frame, a trunk frame extending from said main frame rearwardly toward the rear end of said body portion over said rear wheel,
   a trunk body defining a storage enclosure within said body portion,
   said trunk body including substantially rectangularly disposed bottom, side and top walls affixed to and supported by said trunk frame, said bottom wall extending transversely of said rear wheel superjacent thereto.

17. The scooter-type vehicle of claim 16 wherein said bottom wall contains a concave portion on the lower surface thereof to provide clearance to allow full travel of the rear wheel during running.

18. The scooter-type vehicle of claim 17 wherein said bottom wall extends laterally adjacent said concave portion below the upper path of travel of said rear wheel.

19. The scooter-type vehicle of claim 18 wherein said trunk body side walls extend immediately adjacent and provide lateral support for the inside walls of said cover.

20. The scooter-type vehicle of claim 18 wherein said trunk body projects rearwardly to said body cover and has a rear opening, said body cover having an opening substantially coterminous with said rear opening, and a releasable closure cover closing said opening.

21. The scooter-type vehicle of claim 20 wherein said trunk body has a bottom portion including said bottom wall and an upper portion including said side walls and said top wall separably attached to said bottom portion.

* * * * *

UNITED STATES PATENT AND TRADEMARK OFFICE
CERTIFICATE OF CORRECTION

PATENT NO. : 4,726,439
DATED : February 23, 1988
INVENTOR(S) : Eiichi Iwao et al.

It is certified that error appears in the above—identified patent and that said Letters Patent is hereby corrected as shown below:

On line 47, column 9, replace "scotter" with -- scooter --.

On line 7, column 10, replace "substantially" with -- substantial --.

Signed and Sealed this

Twenty-second Day of November, 1988

Attest:

DONALD J. QUIGG

*Attesting Officer*    *Commissioner of Patents and Trademarks*